United States Patent
Olarig et al.

(10) Patent No.: US 11,443,142 B2
(45) Date of Patent: Sep. 13, 2022

(54) IN-STORAGE-BASED DATA PROCESSING USING MACHINE LEARNING

(71) Applicant: Samsung Electronics Co., Ltd., Suwon-si (KR)

(72) Inventors: Sompong Paul Olarig, Pleasanton, CA (US); Chandranil Chakraborttii, San Francisco, CA (US); Manali Sharma, Santa Clara, CA (US); Praveen Krishnamoorthy, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 16/826,066

(22) Filed: Mar. 20, 2020

(65) Prior Publication Data

US 2021/0256311 A1 Aug. 19, 2021

Related U.S. Application Data

(60) Provisional application No. 62/977,111, filed on Feb. 14, 2020.

(51) Int. Cl.
*G06K 9/62* (2022.01)
*G06N 3/04* (2006.01)
(Continued)

(52) U.S. Cl.
CPC ......... *G06K 9/6257* (2013.01); *G06K 9/6265* (2013.01); *G06N 3/0454* (2013.01); *G06N 3/08* (2013.01); *G06V 10/56* (2022.01)

(58) Field of Classification Search
CPC .. G06K 9/6257; G06K 9/6265; G06K 9/6271; G06V 10/56; G06V 20/00;
(Continued)

(56) References Cited

U.S. PATENT DOCUMENTS 7,474,357 B1  1/2009  Murdock et al.
7,986,834 B2  7/2011  Mazinani et al.
(Continued)

FOREIGN PATENT DOCUMENTS

WO   WO 2017/189104 A1   11/2017

OTHER PUBLICATIONS

Toderici, G. et al., *Full Resolution Image Compression with Recurrent Neural Networks*, Aug. 18, 2016, https://arxiv.org/abs/1608.05148, 9 pages.
(Continued)

*Primary Examiner* — Omar S Ismail
(74) *Attorney, Agent, or Firm* — Lewis Roca Rothgerber Christie LLP (57) ABSTRACT

A programmable data storage device configured to process images via an embedded processor is disclosed. The processor identifies luminance and chrominance data of a received image, and retrieves a first machine learning model stored in the storage device. The first model is applied for making a first prediction about the image based on luminance data, and a first determination is made in regards to a criterion. In response to making the first determination, a first label associated with the first prediction is returned. A second determination is also made in regards to the criterion. In response to making the second determination, a second machine learning model stored in the storage device is retrieved. The second machine learning model is applied for making a second prediction about the image based on the color data associated with the image, and a second label associated with the second prediction is determined.

20 Claims, 3 Drawing Sheets

(51) Int. Cl.
*G06N 3/08* (2006.01)
*G06V 10/56* (2022.01)

(58) Field of Classification Search
CPC .......... G06N 3/0454; G06N 3/08; G06N 3/02; G06N 5/00; G06N 7/00; G06N 10/00; G06N 20/00; G06N 20/10; G06N 20/20
See application file for complete search history.

(56) References Cited

U.S. PATENT DOCUMENTS

| | | | |
|---|---|---|---|
| 9,674,521 B2 | 6/2017 | Lee et al. | |
| 9,754,163 B2 | 9/2017 | Segalovitz et al. | |
| 2009/0154557 A1 | 6/2009 | Zhao et al. | |
| 2012/0287995 A1 | 11/2012 | Budagavi | |
| 2014/0072242 A1 | 3/2014 | Wei et al. | |
| 2018/0268319 A1* | 9/2018 | Guo | G06Q 30/0204 |
| 2018/0336702 A1* | 11/2018 | Cricri | H04N 5/225 |
| 2019/0246102 A1* | 8/2019 | Cho | H04N 19/109 |
| 2020/0026960 A1* | 1/2020 | Park | G05D 1/0077 |
| 2020/0026999 A1* | 1/2020 | Wang | G06K 9/6262 |
| 2020/0234411 A1* | 7/2020 | Xu | H04N 9/07 |
| 2020/0242734 A1* | 7/2020 | Wang | G06N 20/10 |
| 2020/0293064 A1* | 9/2020 | Wu | G06V 20/597 |
| 2020/0349464 A1* | 11/2020 | Lin | G06N 3/084 |
| 2021/0406560 A1* | 12/2021 | Park | G01S 17/931 |

OTHER PUBLICATIONS

Johnston, Nick et al., *Image Compression with Neural Networks,* Google AI Blog, Sep. 29, 2016, https://ai.googleblog.com/2016/09/image-compression-with-neural-networks.html, 5 pages.
YCbCr, Wikipedia, https://wikipedia.org/wiki/YCbCr, 2019, 5 pages.
https://en.wikipedia.org/wiki/Chroma_subsampling, 9 pages.
Kerr, Douglas, *Chrominance Subsampling in Digital Images,* Issue 3, Jan. 19, 2012, http://dougkerr.net/Pumpkin/articles/Subsampling.pdf, 15 pages.

* cited by examiner

IN-STORAGE-BASED DATA PROCESSING USING MACHINE LEARNING

CROSS-REFERENCE TO RELATED APPLICATION(S)

The present application claims priority to and the benefit of U.S. Provisional Application No. 62/977,111, filed Feb. 14, 2020, entitled "IN-STORAGE-BASED IMAGE PROCESSING BASED ON MACHINE LEARNING," the entire content of which is incorporated herein by reference.

FIELD

This application relates to data processing, and more particularly, to data processing with increased efficiency by a storage device using machine learning.

BACKGROUND

Machine learning may be used for data processing tasks such as image processing tasks including, for example, computer vision tasks. Image processing often entails analyzing digital images for pattern recognition. Some machine learning algorithms may use color information in the digital image for such analysis. The color information may be RGB (red, green, blue) data values of the pixels making up the digital image. RGB input can be expressed via three data channels, which can lead to more computations for image processing.

Thus, what is desired is a system and method for utilizing machine learning for image processing that can increase the efficiency of image processing tasks when compared to image processing tasks that use traditional image processing methodologies.

SUMMARY

According to one embodiment, a method for processing images comprises receiving, by a processor embedded in a storage device, an image from a source. The processor identifies luminance and chrominance data for the received image, and retrieves a first machine learning model stored in the storage device. The processor applies the first machine learning model for making a first prediction about the image based on luminance data, and makes a first determination in regards to a criterion. In response to making the first determination in regards to the criterion, the processor returns a first label associated with the first prediction. The processor further makes a second determination in regards to the criterion. In response to making the second determination in regards to the criterion: the processor retrieves a second machine learning model stored in the storage device, applies the second machine learning model for making a second prediction about the image based on the color data associated with the image, and determines a second label associated with the second prediction.

According to one embodiment, the storage device comprises a solid state drive, and the embedded processor comprises a field programmable gate array.

According to one embodiment, the first and second machine learning models comprise a deep neural network.

According to one embodiment, the first or second prediction determines that an object is depicted in the image, and the first or second label identifies the object.

According to one embodiment, the first label identifies the object, and the second label provides color information for the identified object.

According to one embodiment, a confidence value of the first prediction is determined, wherein the second determination is made in response to determining that the confidence level of the first prediction is below a threshold value.

According to one embodiment, an image processing task is identified, wherein the second determination is made in response to determining that the image processing task includes color prediction.

According to one embodiment, the first machine learning model is trained with images containing luminance data.

According to one embodiment, the second machine learning model is trained with images containing the color data.

According to one embodiment, the storage device is hosted in a computing device of at least one of an autonomous vehicle, edge data center, smart store, or smart phone.

Embodiments of the present disclosure are also directed to a programmable data storage system comprising a non-volatile memory; a storage controller configured to control the non-volatile memory; and a processor configured to: receive an image from a source; identify luminance and chrominance data for the received image; retrieve from the non-volatile memory, via the storage controller, a first machine learning model stored in the storage device; apply the first machine learning model for making a first prediction about the image based on luminance data without considering color data; make a first determination associated with a criterion; in response to making the first determination associated with the criterion, return a first label associated with the first prediction; make a second determination associated with the criterion; and in response to making the second determination associated with the criterion: retrieve from the non-volatile memory, via the storage controller, a second machine learning model stored in the storage device; apply the second machine learning model for making a second prediction about the image based on the color data associated with the image; and determine a second label associated with the second prediction.

As a person of skill in the art should recognize, embodiments of the present disclosure result in less compute-time and/or energy usage by a processing element due, at least in part, to a fewer number of pixels that are processed when using luma information of an image, as opposed to RGB or additional color information. Computing a fewer number of pixels may generally result in faster image search with lower power consumption. Further, when used in applications involving an autonomous vehicle, embodiments of the disclosure may enable moving vehicles to more quickly identify objects than conventional methods that consider full color information or enable a smart phone to more quickly identify an owner during login.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

The detailed description set forth below in connection with the appended drawings is intended as a description of exemplary embodiments of a method for in-storage-based image processing via machine learning provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Certain computational tasks, such as, image recognition during self-driving by an autonomous vehicle, may need to be completed as quickly as possible. At the same time, a certain degree of accuracy may be needed as moving vehicles need to quickly identify objects in its surrounding environment to maneuver the car in an appropriate manner. Other types of image processing tasks may also benefit from faster computations over images, such as certain image processing tasks in smart stores (e.g. cashier-less stores, retail stores incorporating artificial intelligence and/or virtual reality, etc.) and/or edge computing devices and/or smart phones. Performing image recognition using RGB information on three color channels may lead to increased computations that may increase the time to recognize the objects and may consume more power. For certain tasks or for image recognition of certain objects, it may not be necessary to employ RGB (color) information for the analysis. Instead, a grayscale and/or luminance (luma) information may be sufficient.

For example, if image processing is performed for a self-driving application on an autonomous vehicle, it may not be necessary to recognize certain features and/or elements of the environment surrounding the vehicle. For instance, although it may be desirable to computationally determine, for instance, pedestrians in front of the vehicle, it may not be important to computationally determine, for example, a particular outfit of a given pedestrian or the color of such an outfit. Doing so may slow-down image processing operations and may contribute to reduced performance and/or reliability in situations where decisions may need to be made with a predetermined latency based on the results of the image processing.

In one embodiment, image processing computations can be accelerated by running a machine learning algorithm within a data storage device itself, using grayscale/luma data at a first stage of the image processing, without considering color information. Processing luma information as a first step may result in processing a fewer number of pixels in comparison with processing color information. This can result in a comparatively lower power consumption while allowing a quicker detection, identification, recognition, and/or classification (collectively referred to as classification) of objects. Depending on the object identified during the first step and attributes of the object, color information may be used for making more precise predictions about the image, as needed, as a second step of the image processing process. For example, in certain situations, an autonomous vehicle may need to not only identify the existence of lane markings or traffic lights within an image, but may also need to identify the color of such lane markings or traffic lights. Color information may thus be considered during the second stage of image processing if the task at hand explicitly or inherently requires color consideration.

Running the first and second stages/steps of image processing within a storage device (e.g., via a computational storage-based approach) can accelerate the identification of objects in an image, when compared to image processing by a central processing unit (CPU) of a host device. For example, moving large amounts of image data or machine learning models to the CPU for processing and analysis may be expensive in terms of amount of energy consumed, and computing and network resources deployed. Such movement of data can increase the burden on resources including, but not limited to, network bandwidth, CPU cycles, and CPU memory (both capacities and bandwidth). By implementing image processing on the same storage device where the image data and machine learning models are stored, the disclosed systems can use the higher available bandwidth within the device (e.g., a solid state drive (SSD)), and preserve the limited bandwidth between the storage device and the host CPU interface such as (e.g., a peripheral component interconnect express (PCIe) interface or a network fabric interface in the case of a remote direct attached storage (RDAS)) or a CPU interconnect such as Gen Z, CCIX (chip-to-chip interconnect architecture) and Open-CAPI (Open Coherent Accelerator Processor Interface).

Hence, techniques for processing of the data closer to or inside the storage device are desirable for time-efficient predictions by consuming less power, thereby resulting in more cost-effective image data processing compared to processing the images in traditional central processing unit (CPU) that is outside the storage device.

Figure 1:
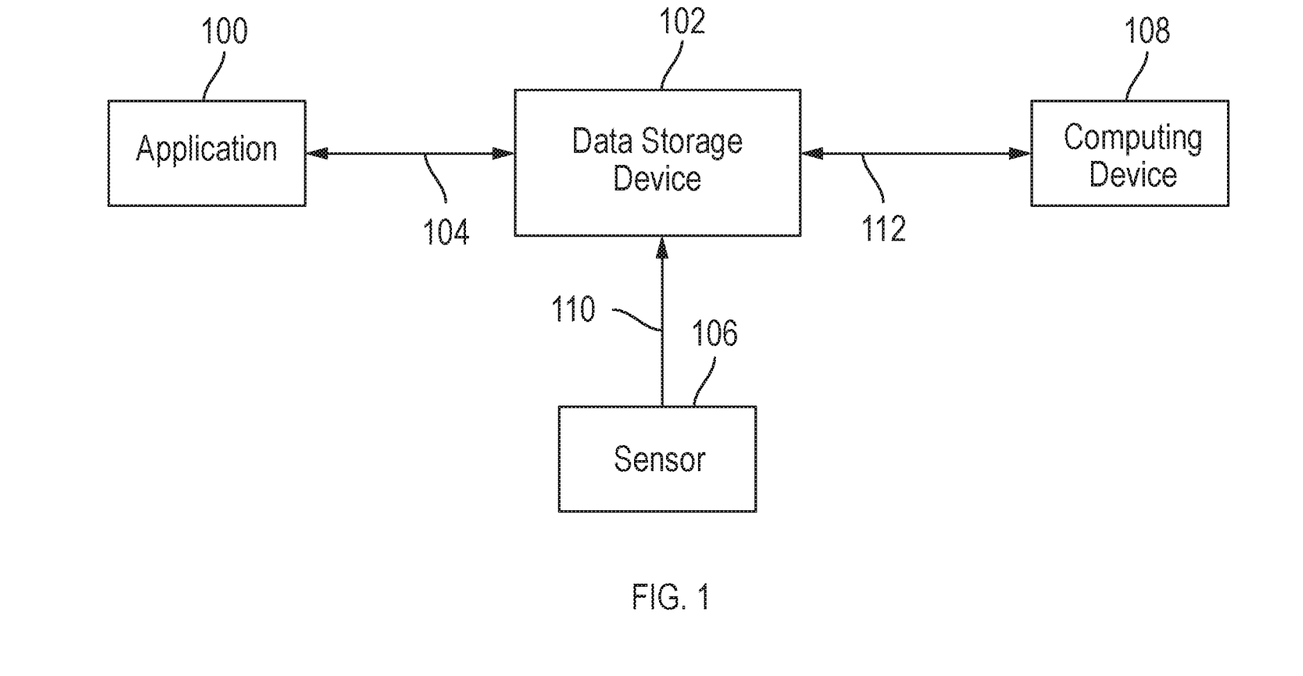
FIG. 1 is a block diagram of a system for in-storage-based data processing according to one exemplary embodiment.

FIG. 1 is a block diagram of a system for in-storage-based image processing according to one exemplary embodiment. The system includes an application module 100 coupled to a programmable storage device 102 over a data communications link 104. The data storage device may further be coupled to one or more sensors 106 and to a computing device 108 over data communication links 110, 112. The data communications links 104, 110, 112 may take the form of peripheral component interconnect express (PCIe) connections, Ethernet connections, and/or the like.

In one embodiment, the one or more sensors 106 include one or more cameras for capturing and transmitting images to the data storage device 102. If the image processing is to be performed for enabling or aiding self-driving, the sensors 106 may also include sensors typical in autonomous vehicles, such as, for example, LIDAR, 360° Video Camera, far infrared ground penetrating radar, ultrasonics, and the like. One or more of such sensors may be used together to detect, for example, that the vehicle is moving or to detect, for example, a specific product in the smart store.

In one embodiment, the data storage device can include a solid state drive (SSD) with an embedded processor. The SSD may be, for example, a Non-Volatile Memory express (NVMe) over Fabrics (NVMe-oF)-compatible SSD such as an Ethernet SSD (eSSD), an NVMe SSD, or other persistent (non-volatile) memory devices.

In one embodiment, the data storage device 102 is hosted in an edge computing system such as, for example, a micro data center, cell tower, an autonomous vehicle, a smart store, a smartphone, an IoT (Internet-of-Things) device, or the like. One or more of the application modules 100 and sensors 106 may also be hosted at the edge computing system.

The application module 100 may include any software application configured to transmit image processing tasks and/or queries to the storage device 102. The application module 100 may further be configured to take action based on the image predictions returned by the storage device. When incorporated into an autonomous vehicle or a smart store, the application module 100 may be configured to send requests to the storage device 102 to identify objects in images captured by the sensor (e.g. camera) 106. For an autonomous vehicle, the identified objects may be pedestrians, other vehicles, lane markings, traffic lights, and/or objects in the vehicle's surroundings. In response to identifying the objects in the images, the application module 100 may be configured to take a particular action, such as, controlling the vehicle to stop, slow down, or move in a particular direction.

Within a smart store, the objects identified by the storage device may be, for example, products picked up by a customer, SKU codes of such products, customers in the store, and/or the like. In response to, for example, the customer leaving the store with the products, the application may be configured to pull product information including, for example, price of the products, for automatically charging the customer for the products. Quick identification of products picked up by the customer within the smart store may also enable determination as to trends and interests by customers in the store.

In one embodiment, the application module 100 can include a search engine resident on any host device accessible to a user. The user may input a search query, and the query may be transmitted to the storage device 102 hosted, for example, in a micro data center, for processing. For example, the user may request images of brown dogs or yellow cats. Results of images satisfying the user's query may then be provided to the application module for display by the host device.

In one embodiment, the data storage device 102 may interact with the computing device 108 for data exchange. The computing devices 108 may be a server, cloud device, another storage device, and/or the like. For example, the computing device 108 may be configured to save various pre-trained machine learning models, and push one or more of the models to the data storage device 102 as appropriate. This may occur, for instance, upon initializing the storage device, and/or when the data storage device needs to switch out a machine learning model already present within the storage device, with another model retrieved from the computing device 108. Instead of pushing the models to the data storage device, the data storage device may also be configured to pull certain machine learning models as appropriate. The computing device 108 may choose and download different machine learning models based on the image processing task or based on the type of request from the application 100. For example, in self-driving vehicles, if the vehicle is driving in foggy weather, a machine learning model that is specifically trained to detect objects in foggy weather may be chosen by the computing device 108.

Figure 2:
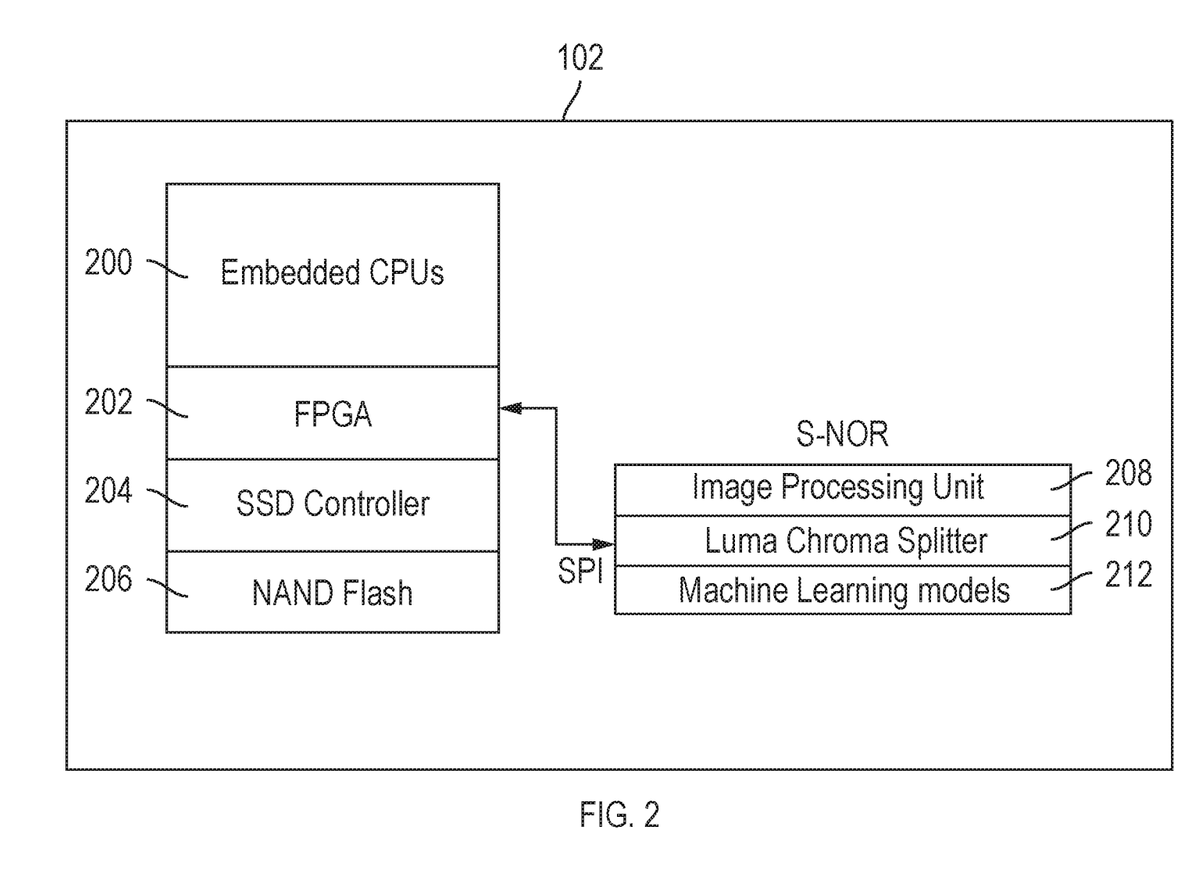
FIG. 2 is a more detailed block diagram of a storage device according to one exemplary embodiment.

FIG. 2 is a more detailed block diagram of the storage device 102 according to one exemplary embodiment. The storage device 102 includes an embedded CPU 200 and other embedded processors including a field-programmable gate array (FPGA) 202 and storage controller 204. The storage device 102 may further include a non-volatile memory 206 such as, for example, a flash memory. In some embodiments, the storage device 102 may be inside a chassis (not shown) that includes an Ethernet switch, and a baseboard management controller (BMC) connected via a directly attached PCIe interface or PCIe switch. The Ethernet switch can provide an Ethernet connection to the storage device 102 over a midplane, and the PCIe switch and/or SMBus switch can provide a management interface to the storage device 102 over the midplane. In some embodiments, the midplane may be broken-up into multiple smaller sections that provide similar or the same connections as the larger midplane, and which may be functionally (e.g. logically or from a circuit point of view), similar or identical. Various small PCBs (printed circuit boards) may be used to implement the decoupled sections of the midplane.

In one embodiment, the BMC may be configured to program the storage device 102 according to instructions given by a system administrator. The BMC may also be configured to manage the internal components of the chassis including the Ethernet switch, the PCIe switch, and the storage device 102. In some embodiments, the Ethernet switch can provide network connectivity to the storage 102 so that, in some embodiments, the Ethernet switch may communicate with the application module 100 and/or computing device 108 over a data communications network.

In one embodiment, the FPGA 202 processes one or more modules for in-storage processing of images using machine learning algorithms. The one or more modules include an image processing unit 208, luma/chroma splitter 210, and one or more machine learning models 212. Although FPGA 202 is used as an example of an embedded processor that includes the modules for in-storage processing of images, a person of skill in the art should recognize that other commercially available embedded processors or custom specific processors such as tensor flow CPU may be used including, for example, an application-specific integrated circuit (ASIC). Also, although the one or more modules 208-212 are assumed to be separate functional units, a person of skill in the art will recognize that the functionality of the modules may be combined or integrated into a single module, or further subdivided into further sub-modules without departing from the spirit and scope of the inventive concept.

In one embodiment, the luma/chroma splitter 210 is configured to receive an image provided by the sensor 106, and separate the luma information from the chroma information. This may be achieved, for instance, by mathematically mapping the RGB color information of the received image, to a YCbCr color space, where Y represents a pixel's luma component, and Cb and Cr represent the pixel's chroma components. The mapping of RGB color information to the YCbCr color space may be accomplished, for example, as described below.

Suppose that $E_R$, $E_G$ and $E_B$ are analog values between 0 and 1 that describe how much red, green and blue there is in a pixel (given eight-bit quantization we have $E_R=R/255$, $E_G=G/255$ and $E_B=B/255$). A typical conversion (e.g. ITU-R Recommendation 624-4 System B,G) to luminance-chrominance is then given by:

$$E_Y=0.299=E_R+0.587=E_G+0.114=E_B$$

$$E_{Cb}=-0.169=E_R-0.331=E_G+0.500=E_B$$

$$E_{Cr}=0.500=E_R-0.419=E_G-0.081=E_B$$

where $E_Y$ is between 0 and 1 and $E_{Cb}$ and $E_{Cr}$ are between −0.5 and 0.5.

Conversion to 8-bit values are then done by:

$Y = 219 \cdot E_Y + 16$ $Cb = 224 \cdot E_{Cb} + 128$ $Cr = 224 \cdot E_{Cr} + 128$ The converted pixel values may then be compressed via chroma subsampling for efficiently storing the image data in the storage device 102. One of various chroma subsampling approaches may be used, where each of the approaches are expressed as a three-part ratio corresponding to the Y, Cb, and Cr values, such as 4:0:0, 4:2:0, 4:2:2, and the like. The subsampling approach may algorithmically discard chroma values at designated pixel positions. The original image and/or the compressed image is then stored in the storage device 102. Applications (e.g., image processing unit 208) subsequently using the compressed image may simply substitute the remaining chroma values in their place.

The image processing unit 208 may use the converted pixel values in the YCbCr color space for classifying the image generated by the pixel values. In one embodiment, a two-stage approach is used by the image processing unit for quickly performing the classification. During the first stage, the image processing unit 208 performs image processing using only luma information. An appropriate machine learning model 212 is retrieved from the memory 206 via the storage controller 204 for doing the first stage processing. Depending on the identified object and its attributes, chroma information may be used during a second stage of processing for a more precise prediction, as needed.

In one embodiment, the chroma information is used during the second stage when confidence of the prediction is lower than a threshold, or when the particular image processing task requires consideration of color. In a majority of cases, however, luma information may be sufficient for identifying objects. In such a case, the image processing may be completed faster by computing based on the luma information without negatively compromising accuracy. When the two-stage approach is used by a moving vehicle, objects may be identified in less time than conventional mechanisms. Experiments show that invoking machine learning models using only luma information results in improvement of prediction time by 21% to 32%, while accuracy decreases only 1.4% to 1.8%, in comparison to using the same models with RGB data. Also, due to the reduced number of pixels that are processed during the first stage using only luma information, the power consumption is also reduced when no second stage processing is performed.

In one embodiment, various pre-trained machine learning models 212 are stored in the memory 206 of the storage device 102. The machine learning models may each be a neural network including, without limitation, a convolutional neural network (CNN), recurring neural network (RNN), recursive neural network (RNN), long short-term memory (LSTM), combinations thereof, and/or the like, where each machine learning model may comprise of various neural network architectures with different number of layers and different number of nodes within each layer of the neural network. Different types of machine learning models may be trained for different types of tasks to be performed. For example, one model may be trained for self-driving, another model for identifying household items, and yet another model for identifying hand-written characters. In some embodiments, a single generalized machine learning model may be trained for use for multiple types of disparate image processing tasks.

Various models may also be trained and maintained for a particular type of image processing task to be performed (e.g. image-processing for self-driving). In one embodiment, the models are trained using luma information, using chroma information, using both luma and chroma information, and/or using RGB data. In one embodiment, models may be trained or retrained at the computing device 108 during, for example, the night. One or more of the appropriate models may be retrieved from the computing device 108 and stored in the memory 206 of the data storage device 102 during initialization or re-configuration of the data storage device.

The type of component that is invoked by the image processing unit 208 for an image processing task depends on whether the first stage or second stage of prediction is being performed. In one embodiment, the component trained using only luma data is retrieved during the first stage of prediction. The components trained based on only chroma, both luma and chroma, or RGB data is retrieved if prediction moves to the second stage. For example, a component trained using only chroma may be retrieved during the second stage if color of an identified object is to be predicted. In another example, a component trained based on both luma and chroma data, or a component trained based on RGB data, may be retrieved during the second stage if prediction using only luma information fails to meet by identifying an object below a predetermined threshold amount representing a confidence level associated with the prediction.

Figure 3:
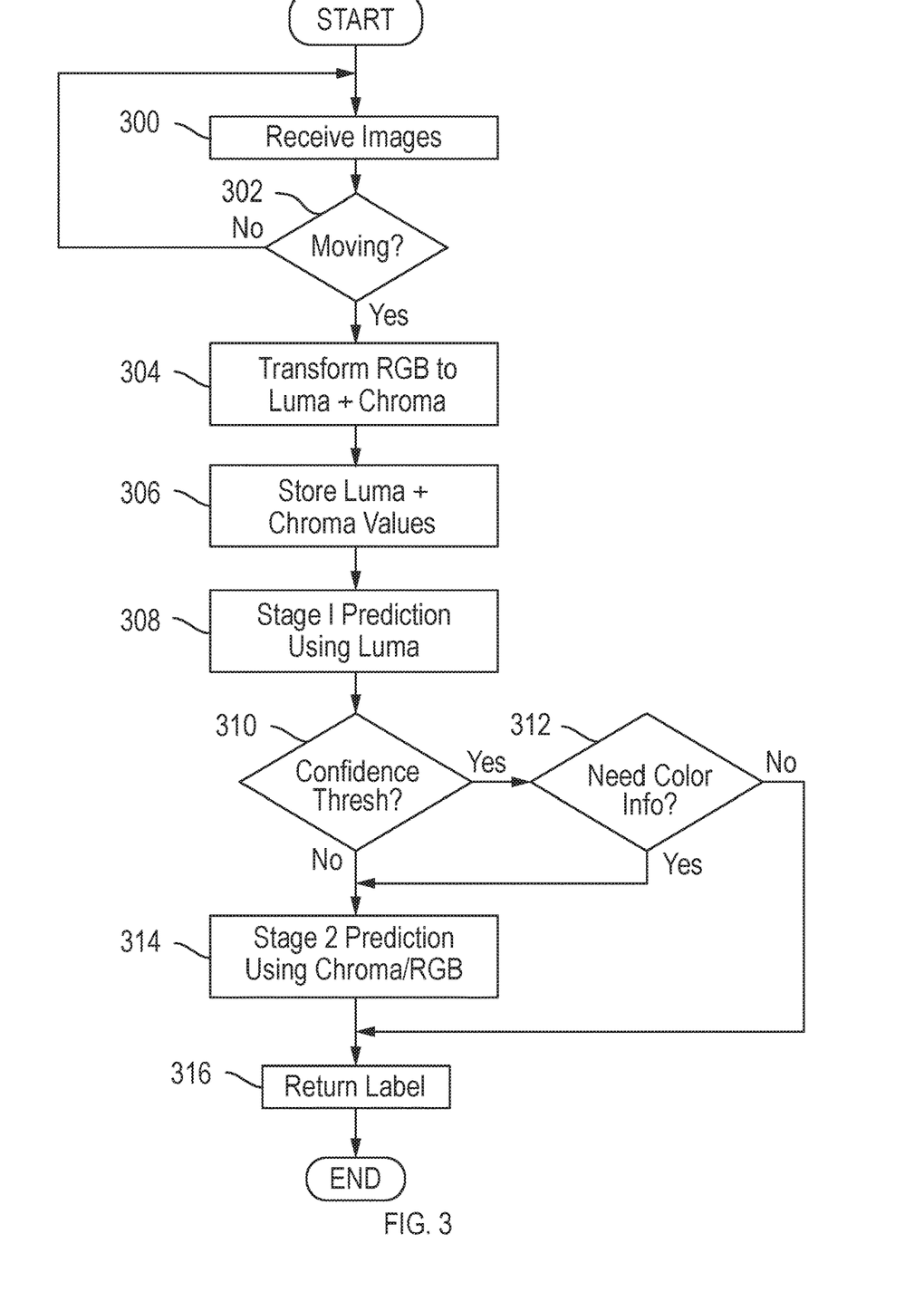
FIG. 3 is a flow diagram of a process for in-storage-based data processing according to one exemplary embodiment.

FIG. 3 is a flow diagram of a process for in-storage-based image processing according to one exemplary embodiment. In act 300, the image processing unit 208 receives an image from, for example, the sensor 106. If the image processing is to be performed for autonomous driving, a determination is made, in act 302, as to whether the autonomous vehicle is moving 302. Such information may be provided, for example, by the one or more sensors 106 coupled to the autonomous vehicle.

In act 304, the image processing unit 208 invokes the luma/chroma splitter 210 for transforming the RGB data in the received image, into luma and chroma data. No such transformation may be needed if the received images are already in the YCbCr color space.

In act 306, the luma and chroma data are separately stored in the memory 206 of the storage device 102. In one embodiment, the luma and/or chroma data is retained in the storage device 102 even after the prediction process is complete. This may be used, for example, for retraining the machine learning model based on feedback received by the image processing unit on the accuracy of the prediction. The disclosed systems may retain the luma and chroma data, at least for a certain period of time, in order to reconstruct and provide the received image to a requesting user. In some embodiments, the luma and/or chroma data is deleted from the memory 206 once the prediction process is complete. This may help free up memory in situations where the data is no longer required.

In act 308, the image processing unit 208 selects one of the machine learning models 212 stored in the memory 206 of the storage device 102 (via the storage controller 204), and applies the selected machine learning model for making a first stage prediction about the received image. In one embodiment, the first stage prediction is done based on luma data alone, without considering chroma data, for quicker prediction results. The machine learning model that is selected for the first stage prediction may include a convolutional neural network (CNN) that has been trained based on luma data. The CNN model may be invoked to apply filters to detect certain features (e.g. edges) of the image. The CNN allows images to be converted into a form that is easier to process, without losing features that may facilitate accurate prediction. In general terms, different convolutional layers of the CNN are applied to capture features with different levels of abstraction. For example, the first convolutional layer may be responsible for capturing low-level features such as edges, gradient orientation, and the like. A pooling layer may further reduce the spatial size of the convolved features. The final output of the pooling layer may then be flattened and fed to a regular neural network (e.g. a fully connected simple neural network) for classification purposes. In this regard, a label or category or class is returned for an object in the image based on the machine learning model's prediction. For example, based on predicting that the image contains a pedestrian, a label indicating a pedestrian is returned by the image processing unit 208.

In act 310, a determination is made as to whether a particular criterion has been met for deciding whether image processing may end with the first stage prediction, or needs to advance to a second stage prediction. In one embodiment, the particular criterion is the confidence of the prediction. In this regard, the classification in act 308 returns a confidence value indicating a probability that the predicted label is correct.

Referring again to act 310, if the confidence value is above the preset threshold, a determination is made, in act 312, as to whether color information should be considered for providing a more precise or accurate identification of the object. In one embodiment, a determination as to whether color information should be considered may depend on the object identified during the first step and attributes of the object. For example, in self-driving vehicles, if the object identified in the image is a pedestrian, it may not be necessary to use chroma information to detect color of the pedestrian's clothes. However, if the object identified in the image is an ambulance, it may be necessary to use chrominance information to detect if the lights on the ambulance is flashing red and blue color, which may result in the action of yielding the right-of-way to the ambulance. As yet another example, in a smart store, if the product identified comes in various colors, then it may be necessary to use the chrominance information to detect the color of the product to determine the price for the product in that particular color.

The determination as to whether color information should be considered may also depend on the query provided by the application module 100 that triggers the prediction process. For example, if the query triggering the prediction process explicitly or implicitly queries for color, the second stage prediction is triggered. Such a query may be a search request by a user for a "yellow cat" or "pink flowers." Color information may also be inherently needed for certain image processing tasks. For example, color may need to be predicted for identifying lane markings to determine traffic direction (e.g. white vs. yellow), whereas such color information may not be needed for identifying pedestrians.

Referring again to acts 310 and 312, if it is determined in act 310 that the confidence level is below the preset threshold, or it is determined in act 312 that color information should be considered, the image processing unit 208 engages in a second stage prediction in act 314. In this regard, the image processing unit 208 invokes an appropriate machine learning model from the various machine learning models 212 stored in the memory 206 of the storage device 102. For example, if the second stage is triggered due to the confidence level being low, the machine learning model that is retrieved from the memory 206 via the storage controller 204 may be a model that is trained using RGB information, or a model trained using both luma and chroma information. The RGB or luma and chroma data of the image may then be used for reclassifying the image based on the newly retrieved machine learning model. Because more pixel data is analyzed during the second stage, a more accurate prediction of objects in the image may be obtained than based on luma data alone.

In some instances, the machine learning model that is invoked in the second stage is a model trained using only chroma data. This model may be appropriate for classifying a color of an object detected during the first stage. For example, if the query/task provided to the image processing unit 208 is whether the image contains a yellow cat, the first stage of the machine learning model using only luma data may predict that the image contains a cat. The second stage of the machine learning model may then predict the color of the cat as yellow.

In act 316 a label of the first and/or second prediction stages is then returned for the classified object. In one embodiment, the label is a combination of labels produced from the first and second predictions. For example, the label from the first stage may be "cat", and the label from the second stage may be "yellow," resulting in a combined label of "yellow cat" to be returned in act 316. In another embodiment, the label from the first stage prediction is replaced with the label of the second stage prediction which is deemed to be more accurate. For example, if the first stage prediction generates a label of an object as a bicycle with a level of confidence below the threshold level, and the second stage prediction generates a label of the object as a motorcycle with a level of confidence above the threshold hold, the output label in act 316 is a motorcycle.

Separating luma and chroma information, and implementing a two-staged approach to image classification using machine learning as described herein helps to provide faster image search for image examination and transcoding, without compromising the search accuracy expected by a particular image processing task. In addition, running the machine learning algorithm within the storage device itself results in more efficient and cost-effective image classification when compared to traditional mechanisms that may perform the processing via a CPU.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for in-storage-based image processing have been specifically described and illustrated herein, many modifications and variations will be apparent to those skilled in the art. Accordingly, it is to be understood that a system and method for knowledge distillation constructed according to principles of this disclosure may be embodied other than as specifically described herein. The disclosure is also defined in the following claims, and equivalents thereof.

What is claimed is:

1. A method for processing images comprising:
   receiving, by a processor embedded in a storage device, an image from a source;
   identifying, by the processor, luminance and chrominance data for the received image;
   retrieving, by the processor, a first machine learning model stored in the storage device;
   applying, by the processor, the first machine learning model for making a first prediction about the image based on the luminance data;
   selectively conducting a second prediction based on a result of the first prediction, the conducting of the second prediction including:
      retrieving, by the processor, a second machine learning model stored in the storage device;
      applying, by the processor, the second machine learning model for making the second prediction about the image based on the chrominance data associated with the image; and
      determining, by the processor, a first label associated with the second prediction.

2. The method of claim 1, wherein the storage device comprises a solid state drive, and the processor embedded in the storage device comprises a field programmable gate array.

3. The method of claim 1, wherein the first and second machine learning models comprise a deep neural network.

4. The method of claim 1, wherein the first prediction or the second prediction determines that an object is depicted in the image, and the first or second label identifies the object.

5. The method of claim 1 further comprising:
   returning a second label associated with the first prediction, wherein the second label identifies an object, and the first label provides color information for the object.

6. The method of claim 1 further comprising:
   determining a confidence value of the first prediction, wherein the second prediction is made in response to determining that the confidence value of the first prediction is below a threshold value.

7. The method of claim 1 further comprising:
   identifying an image processing task, wherein the second prediction is made in response to determining that the image processing task includes color prediction.

8. The method of claim 1, wherein the first machine learning model is trained with images containing luminance data.

9. The method of claim 1, wherein the second machine learning model is trained with images containing the chrominance data.

10. The method of claim 1, wherein the storage device is hosted in a computing device of at least one of an autonomous vehicle, edge data center, or smart store.

11. A programmable data storage system comprising:
    a non-volatile memory;
    a storage controller configured to control the non-volatile memory; and
    a processor configured to:
       receive an image from a source;
       identify luminance and chrominance data for the image;
       retrieve from the non-volatile memory, via the storage controller, a first machine learning model stored in the non-volatile memory;
       apply the first machine learning model for making a first prediction about the image based on the luminance data;
       selectively conduct a second prediction based on a result of the first prediction, wherein in selectively conducting of the second prediction, the processor is configured to:
          retrieve from the non-volatile memory, via the storage controller, a second machine learning model stored in the non-volatile memory;
          apply the second machine learning model for making the second prediction about the image based on the chrominance data associated with the image; and
          determine a first label associated with the second prediction.

12. The system of claim 11, wherein the first and second machine learning models comprise a deep neural network.

13. The system of claim 11, wherein the first prediction or the second prediction determines that an object is depicted in the image, and the first or second label identifies the object.

14. The system of claim 11, wherein the processor is further configured to:
   return a second label associated with the first prediction, wherein the second label identifies an object, and the first label provides color information for the object.

15. The system of claim 11, wherein the processor is further configured to:
   determine a confidence value of the first prediction, wherein determining whether a criterion has been satisfied includes determining whether the confidence value of the first prediction satisfies a threshold value.

16. The system of claim 11, wherein the processor is further configured to:
   identify an image processing task, wherein the second prediction is made in response to determining that the image processing task includes color prediction.

17. The system of claim 11, wherein the first machine learning model is trained with images containing luminance data.

18. The system of claim 11, wherein the second machine learning model is trained with images containing the chrominance data.

19. The system of claim 11, wherein the non-volatile memory is hosted in a computing device of at least one of an autonomous vehicle, edge data center, or smart store.

20. The system of claim 11, wherein the processor includes a field programmable gate array.

* * * * *